Jan. 8, 1963 R. LUBOW ET AL 3,072,543

DIELECTRIC SIGNAL STORAGE DEVICE

Filed Oct. 8, 1958

RAYMOND LUBOW
MARVIN LUBOW
INVENTORS

BY Lyon & Lyon
ATTORNEYS

United States Patent Office 3,072,543
Patented Jan. 8, 1963

3,072,543
DIELECTRIC SIGNAL STORAGE DEVICE

Raymond Lubow, 17007 Merit Ave., Gardena, Calif., and Marvin Lubow, 11828 S. Daphine, Inglewood, Calif.

Filed Oct. 8, 1958, Ser. No. 765,983
2 Claims. (Cl. 204—38)

This invention relates to dielectric media and, more particularly, to improvements therein.

In an application by Raymond Lubow for a Delay Apparatus, filed February 21, 1958, Serial No. 716,797, and now U.S. Patent No. 2,892,898, there is described and claimed a novel electrostatic storage system. In the embodiment of the invention described, the storage system comprises a writing electrode to which signals are applied, a reading electrode, both of which are in operative contact with a dielectric record medium, and a common electrode which is in contact with all of the dielectric recording medium. The common electrode in the prevailing embodiment comprises aluminum and the dielectric medium comprises aluminum oxide. This oxide may either be that which is formed naturally on the surface of exposed aluminum, or, preferably, may be an anodized layer. It was found that this arrangement operated satisfactorily for the purpose of recording, for example, acoustical signals and subsequently reading them back at some interval later as desired. In continuing to seek arrangements for improving the performance of the system for obtaining very much lower signal-to-noise characteristics and greater storage properties, the applicants have developed the present invention, which provides a very much improved dielectric storage system.

Accordingly, an object of the present invention is to provide an improved dielectric storage system.

Yet another object of the present invention is to provide a novel and useful dielectric storage medium.

Still another object of the present invention is the provision of a dielectric storage medium suitable for utilization for signal storage.

These and other objects of the invention are achieved in an arrangement wherein the dielectric storage medium which, as indicated previously, comprises an oxide of a metal, which has been coated or impregnated to provide a dielectric vehicle wherein there are insulatingly supported a plurality of conductive particles. These improve the resultant operation of the dielectric storage device to a considerable extent by enhancing the storage properties, and reducing the signal-to-noise ratio of the signal obtained upon read-out.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
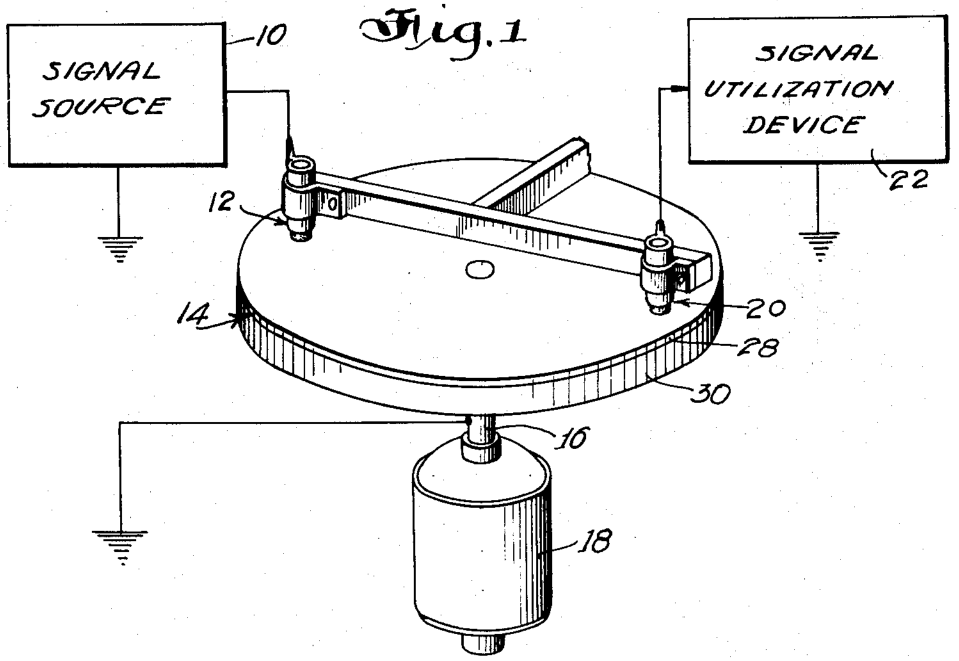
FIGURE 1 is a diagram of a dielectric recording system.

Referring now to FIGURE 1, there may be seen a diagram of a system which is the same FIGURE 1 as is shown in the application mentioned previously to Raymond Lubow, Serial No. 716,797. This drawing and that of FIGURE 2 herein is being shown in order to assist in an understanding of this invention. Signals for recording are obtained from a signal source 10. These are applied to a recording electrode 12, which may be in contact with the dielectric recording means being employed. By way of example, the dielectric recording means may be in the form of a disc 14, supported by a shaft 16 which is rotatably driven by a motor 18. A reading, or pickup, electrode 20, which may be identical in composition with the writing electrode 12, is positioned a distance therefrom to provide a desired delay interval. These electrodes may be made of "conductive rubber" which is neoprene impregnated with graphite. The signal read by the electrode 20 is applied to a signal utilization device 22.

Figure 2:
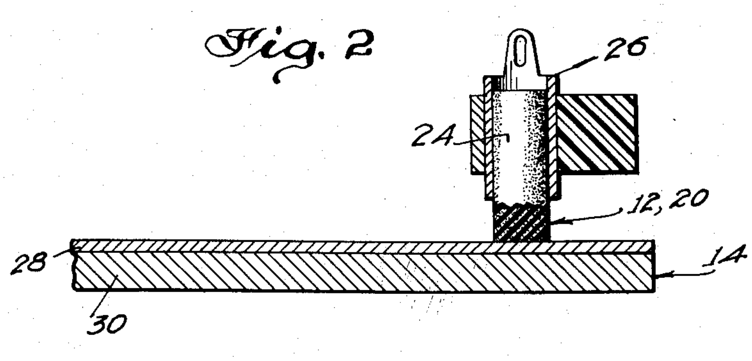
FIGURE 2 is an enlarged view in section of the dielectric recording system shown in FIGURE 1.

As shown in FIGURE 2, the electrode 24 is supported by means of a metal holder 26, relative to the dielectric surface 28. The dielectric material itself 28 comprises an oxide of a metal, such as aluminum or magnesium. This oxide is formed on a backing comprising the metal itself 30, which also serves as a common electrode for the reading and writing electrodes.

Figure 3:
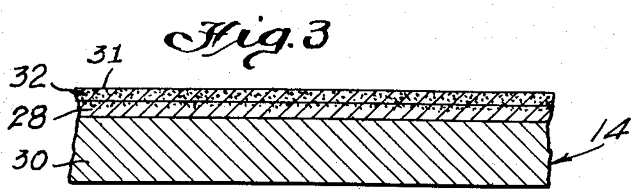
FIGURE 3 is an enlarged cross-sectional view of an embodiment of the invention.

In accordance with this invention, a greatly improved result may be obtained when, as represented in FIGURE 3 of the drawing, the dielectric material is made to include a plurality of insulatingly spaced conductive particles. This may be achieved in a number of different ways. One of these is to coat the metallic oxide 28 with a mixture consisting of a vehicle which is a dielectric fluid 31, carrying conductive particles 32. The precise theory or explanation of the operation is not understood. However, the best theory which can be advanced at present is that the conductive particles are each insulated from one another by the dielectric fluid within which they are suspended and operate as small capacitors increasing the effectiveness of the transfer of signal from the reading electrode to the dielectric storage medium and the readout of the signal from the dielectric storage medium.

The signal sensitivity of the storage medium is considerably extended, and by the virtue of the vehicle having lubricating qualities, static electricity, which is generated by the rotation of the dielectric medium, is eliminated, as well as a great deal of other noise-producing factors.

Several suitable dielectric vehicles, as well as conductive particles, were found to provide said operation. For example, a mixture of oil and conductive particles selected from the group, consisting of graphite, carbon black, and lamp black, provided said operation. A mixture of oil and conductive particles, which can be any metallic particles such as powdered silver and the like, provided excellent operation. Molybdenum disulphide provided satisfactory operation. The conductive particles need not be solid particles and should not be so limited. They can be conductive drops of a liquid which are obtainable for example in an emulsion. These can be referred to as "liquid particles." An emulsion which gives excellent results is one wherein glycerine and wax are mixed with the conductive particles being the glycerine.

The mixture is coated on the metal oxide. Although satisfactory operation is obtained by coating or impregnating the metal oxide which forms naturally on the surface of, for example, aluminum or magnesium, a preferred metal oxide formation which provides improved results is obtained by anodizing the aluminum. The oxide obtained by the process of anodization is more porous than that obtained naturally, and the carrier and vehicle can thus more readily penetrate into the oxide through the pores. A control over the length of time during which storage of a signal is obtained may be provided by controlling the thickness of the anodized layer. The thicker the layer, the greater the length of storage time. Storage time also increases with increase in oil viscosity, and increase in particle size. With a porous oxide the conductive particles such as graphite may be rubbed into the pores to provide the required plurality of conductive particles dispersed in a dielectric.

The improvement obtained by using the mixture of dielectric vehicle and conductive particles is not dependent upon the particle concentration. This is not critical, as long as each of the conductive particles are insulatingly coated by the dielectric vehicle within which they are mixed.

The dielectric vehicle need not necessarily be oil. It can also be wax or paraffin which when liquid have conductive particles mixed therein. This mixture is then brushed on the aluminum oxide while in the liquid state.

The effect of particle size is to limit the highest frequency which can be recorded. The particle size should be less than the wavelength of the highest frequency sought to be recorded. A preferred size is that the particle should be less than one-half the wavelength of the highest frequency sought to be recorded.

There has accordingly been described and shown herein a novel, useful, and inexpensive improvement in a dielectric storage material. The form of the dielectric storage material as shown herein is merely for the purpose of illustration and should not be considered as a limitation upon this invention. An improved dielectric storage medium may have the form of a ribbon, such as is commonly employed with magnetic tape, a drum, or can even be employed as the target of a dielectric storage tube where the writing electrode can comprise an electron beam which is modulated by the signal desired to be recorded.

We claim:

1. An improved dielectric signal storage medium comprising an anodized aluminum surface coated with a mixture of a dielectric vehicle and conductive particles said mixture comprising a mixture of wax and metallic particles.

2. An improved dielectric signal-storage medium comprising an anodized aluminum surface coated with a mixture of a dielectric vehicle and conductive particles, said mixture comprising an emulsion of glycerine and wax.

References Cited in the file of this patent

UNITED STATES PATENTS

| | | |
|---|---|---|
| 1,822,072 | Wiegand | Sept. 8, 1931 |
| 2,157,155 | Work et al. | May 9, 1939 |
| 2,200,741 | Gray | May 14, 1940 |
| 2,418,804 | Hood | Apr. 8, 1947 |
| 2,580,524 | Daussan | Jan. 1, 1952 |
| 2,726,168 | Roddin et al. | Dec. 6, 1955 |
| 2,760,925 | Bryant | Aug. 28, 1956 |
| 2,787,750 | Jones | Apr. 2, 1957 |

FOREIGN PATENTS

| | | |
|---|---|---|
| 116,388 | Australia | Jan. 5, 1943 |
| 707,065 | Great Britain | Apr. 14, 1954 |
| S 40,430 | Germany | Mar. 15, 1956 |